United States Patent [19]

Southall, deceased

[11] 3,920,350

[45] Nov. 18, 1975

[54] SPADE BIT

[75] Inventor: William Southall, deceased, late of Moonah, Australia, by Dorothy I. Southall, administratrix

[73] Assignee: The Stanley Works, New Britain, Conn.

[22] Filed: Feb. 11, 1974

[21] Appl. No.: 441,173

[52] U.S. Cl............... 408/211; 145/116 R; 408/225
[51] Int. Cl.² .................... B23B 51/00; B27G 15/00
[58] Field of Search .................... 408/199, 223–225, 408/211–214; 145/116 R

[56] References Cited
UNITED STATES PATENTS

| 2,689,131 | 9/1954 | Priest | 145/116 R |
| 2,782,824 | 2/1957 | Robinson | 145/116 R |

Primary Examiner—Donald R. Schran
Assistant Examiner—Leon Gilden

[57] ABSTRACT

A spade bit is provided of the type particularly adapted to be employed with a hand-type power tool such as an electrical drill or drill press for purposes of cutting through a non-metal material such as wood. The spade bit has basically three main portions, namely, a shank, a blade and a point. In accord with the preferred form thereof, the spade bit is formed as an integral member. The shank of the spade bit has a generally cylindrical configuration with the free end thereof being of polygonal shape to provide a plurality of surfaces which can be cooperatively grasped by the jaws of a chuck into which the shank of the spade bit is desired to be inserted for purposes of cooperatively associating the spade bit with a power tool. The other end of the shank terminates in the portion of the spade bit referred to as the blade. The blade has a generally rectangular configuration which is formed by a pair of substantially planar surfaces and has a thickness which is substantially less than the diameter of the shank. The blade at the leading end thereof terminates in a pair of beveled surfaces with one of the beveled surfaces being inclined in one direction and the other of the beveled surfaces being inclined in the opposite direction. The latter surfaces of the blade comprise the cutting surfaces thereof. Projecting outwardly from the leading end of the blade intermediate the pair of beveled surfaces provided thereat, there is formed a generally diamond-shaped point. The point is ground to reduce the negative rake and thereby improve the cutting ability thereof. In addition, the point is provided with a relatively large point angle to make the point because of its increased cutting efficiency perform more of the cutting function and with less of the cutting function being performed by the cutting surfaces of the blade.

9 Claims, 6 Drawing Figures

SPADE BIT

BACKGROUND OF THE INVENTION

It has long been known in the prior art to employ spade bits for purposes of cutting through a substance primarily such as wood. By and large though, these prior art forms of spade bits have been characterized by the fact that they differ somewhat one from the other. More specifically, the differences which exist between prior art spade bits reside primarily in the fact that they possess differing structural features operable to create functional differences therebetween rather than merely differences in appearance. For example, although essentially all of the spade bits which have been provided heretodate in the prior art have consisted of a shank, a blade and a point and more often the spade bit has been formed as a integral member, nevertheless it has also been known previously to provide a spade bit wherein the blade and point of the spade bit have been formed separately from the shank of the spade bit. The latter type of spade bit is exemplified for instance by the spade bit shown in U.S. Pat. No. 2,689,131. One advantage stated to be possessed by the latter type of spade bit is that by forming the latter in a plurality of pieces the manufacture thereof is facilitated. In addition, it may be possible to provide a plurality of spade bit blades of differing sizes designed to be utilized with one common shank thereby eliminating the necessity of providing each spade bit with a separate shank.

Another structural distinction possessed by some types of prior art spade bits which functions as a distinguishing feature thereof is the angle at which the cutting surfaces of the blade of the spade bit are inclined. For example, this is exemplified in the spade bit shown in U.S. Pat. No. 2,794,468 which embodies a construction wherein the angle defined between the tip of the point of the spade bit and each of the cutting surfaces formed along the leading edge of the blade of the spade bit is a right angle. The effect of providing a 90° angle therebetween is stated to be that it renders it easier to accomplish the sharpening of the cutting surfaces of the spade bit.

Yet another structural distinction which exists between different ones of the prior art forms of spade bits is the embodiment therein of means to reduce the amount of torque and thrust required to be used in the employment of the spade bit. In this connection, reference may be had to U.S. Pat. No. 2,782,824 wherein there is shown a spade bit which by way of exemplification it is stated possesses such a means. More specifically, the spade bit which is depicted in U.S. Pat. No. 2,782,824 is provided with a furrow along each of the side surfaces of the point of the spade bit. The result produced through the use of such furrows is stated to be that the point of the spade bit penetrates the surface of the substance being cut, i.e., wood with less expenditure of energy.

Notwithstanding the fact that a large number of spade bits have been provided heretofore in the prior art embodying different forms of construction, there has nevertheless still existed a need to provide a spade bit which is characterized by the improved cutting efficiency which it possesses. More specifically, although a number of improvements have been made in the construction of spade bits as exemplified by those shown in the prior art identified in the preceding paragraphs, by and large these improvements have been limited generally to features of the spade bit other than the basic cutting efficiency thereof.

Accordingly, it is an object of the present invention to provide a novel and improved spade bit of the type particularly adapted to be employed with a hand-type power tool such as an electrical drill or drill press for purposes of cutting through a non-metal material such as wood.

It is another object of the present invention to provide such a spade bit consisting of a shank, a blade and a point, and which is formed as an integral member.

A further object of the present invention is to provide such a spade bit wherein the leading edge of the blade thereof terminates in a pair of beveled surfaces which comprise cutting surfaces with one of the pair of beveled surfaces being inclined in one direction and with the other of the pair of beveled surfaces being inclined in the opposite direction.

A still further object of the present invention is to provide such a spade bit wherein the point thereof has a substantially diamond-shaped configuration effective as a means of providing a spade bit characterized by its improved efficiency of cutting.

Yet another object of the present invention is to provide such a spade bit wherein the point thereof has been ground to reduce the negative rake and thereby improve the cutting ability thereof.

Yet a still further object of the present invention is to provide such a spade bit wherein the point thereof is provided with a relatively large point angle to make the point because of its improved cutting efficiency perform more of the cutting function and with less of the cutting function being performed by the cutting surfaces of the blade.

SUMMARY OF THE INVENTION

It has now been found that the foregoing and related objects can be readily attained in a spade bit, which is adapted to be employed with a hand-type power tool such as an electrical drill or drill press for purposes of cutting through a non-metal material such as wood. The spade bit is provided with a shank, a blade and a point. The shank of the spade bit has a generally cylindrical configuration with the free end thereof being of polygonal shape. The latter provides a plurality of surfaces which can be cooperatively grasped by the jaws of a chuck into which the shank of the spade bit is designed to be inserted for purposes of cooperatively associating the spade bit with a power tool. A blade is provided at the other end of the shank. The blade at the leading end thereof terminates in a pair of beveled surfaces which comprise cutting surfaces, with one of the pair of beveled surfaces being inclined in one direction and with the other of the pair of beveled surfaces being inclined in the opposite direction. Projecting outwardly from the leading end of the blade intermediate the pair of beveled surfaces provided thereat, there is formed a substantially diamond-shaped point. Such a configuration for the point has been found to be effective to improve the cutting efficiency of the spade bit.

In accord with the preferred embodiment of the invention, the spade bit is formed as an integral member. The blade of the spade bit has a generally rectangular configuration which is formed by a pair of substantially planar surfaces and has a thickness which is significantly less than the diameter of the shank of the spade bit. The beveled surfaces formed at the leading end of the blade are inclined so that one of the beveled surfaces angles inwardly from a first one of the planar surfaces of the blade of the spade bit to the second one thereof, while the other of the beveled surfaces angles inwardly from the second one of the planar surfaces of the blade of the spade bit to the first one thereof. In addition, the beveled surfaces formed at the leading end of the blade each extend outwardly from the center of the blade at a slight angle so that the outermost ends of the beveled surfaces are located slightly further along the length of the spade bit than are the innermost ends of the beveled surfaces. The portions of material present at the location whereat the point of the spade bit is joined with the inner ends of the beveled surfaces of the blade are undercut to blank out the corners existing therebetween which are known to cut inefficiently. The point of the spade bit is configured so that starting at the end thereof whereat the point is joined to the blade the side edges of the point diverge outwardly to a slight extent for a short distance and then converge inwardly at a relatively sharp angle so as to provide the point of the spade bit with a tip. Accordingly, the width of the point at the location where it is joined to the blade is less than the width of the point at a position spaced outwardly a slight distance from the aforesaid location. Each of the side edges of the point is beveled with one of the side edges thereof being inclined in one direction and with the other one of the side edges thereof being inclined in the opposite direction. The point is provided with a pair of substantially planar surfaces which are ground to reduce the negative rake and thereby improve the cutting ability of the spade bit. In addition, the point is provided with a relatively large point angle to make the point because of its increased cutting efficiency perform more of the cutting function and with less of the cutting function being performed by the cutting surfaces with which the blade of the spade bit is provided.

DETAILED DESCRIPTION OF THE ILLUSTRATED EMBODIMENT

Figure 1:
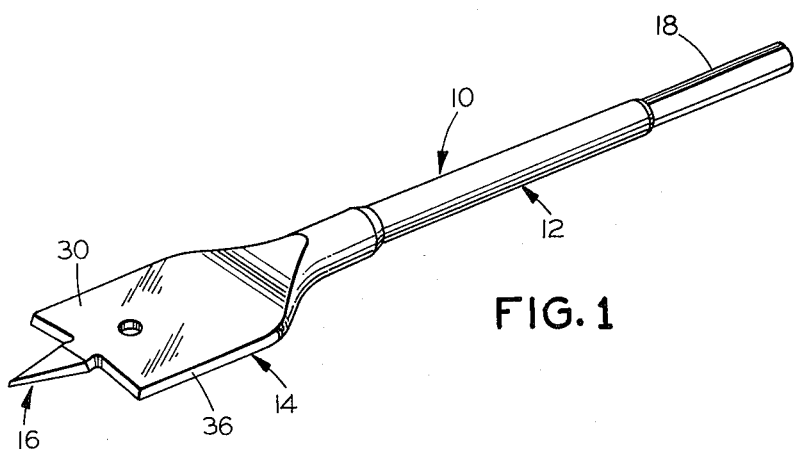
FIG. 1 is a perspective view of a spade bit constructed in accordance with the present invention.

Referring now to the drawings, and more particularly FIG. 1 thereof, there is illustrated therein a spade bit, generally designated by reference numeral 10, constructed in accordance with the present invention. The spade bit 10 which is particularly adapted to be employed with a hand-type power tool such as an electrical drill or drill press for purposes of cutting through a material such as wood consists of a shank 12, a blade 14 and a point 16. In accord with the illustrated embodiment thereof, the spade bit 10 is formed as an integral member with the shank 12, blade 14 and point 16 all being integrally interconnected together.

The shank 12 as best understood with reference to the figures of the drawings is generally cylindrical in configuration. At one end thereof, the shank 12 is provided with a polygonal shaped portion 18 of reduced diameter. The portion 18 provides a plurality of surfaces which may be grasped by the jaws of a chuck of a power tool (not shown) with which the spade bit 10 is adapted to be employed. At the junction between the portion 18 and the main body 20 of the shank 12, a narrow circular ring 22 is formed. The latter ring 22 functions in the nature of a shoulder. Adjacent to the ring 22, a beveled surface 24 is provided extending between the main body 20 and the ring 22. At its other end, the shank 12 is joined to the blade 14. More specifically, the shank 12 is provided with a second beveled surface, i.e., surface 26 which functions to connect the main body 20 with the circular portion 28 of enlarged diameter which terminates in the blade 14.

Figure 2:
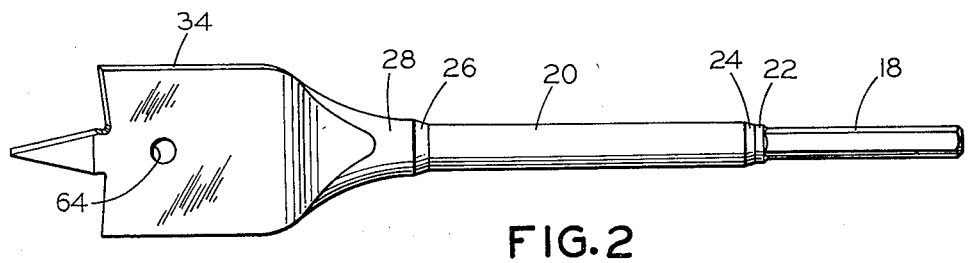
FIG. 2 is a top plan view of a spade bit constructed in accordance with the present invention.
Figure 3:
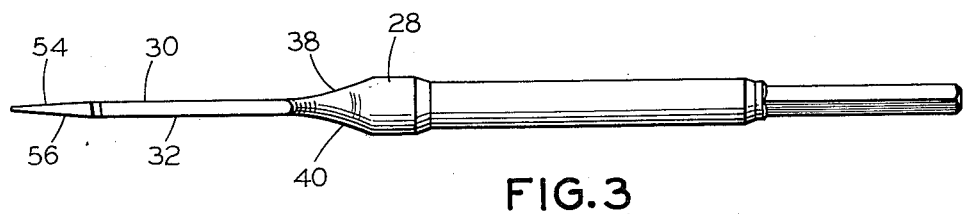
FIG. 3 is a side elevational view of a spade bit constructed in accordance with the present invention.

Turning next to a consideration of the blade 14, the latter as best understood with reference to FIGS. 1-3 of the drawings is substantially rectangular in configuration. The rectangular configuration of the blade 14 is provided by a pair of substantially planar top and bottom surfaces, i.e., upper and lower faces 30 and 32 interconnected by a pair of side portions, i.e., edges 34 and 36. As depicted in FIG. 3 of the drawings, the blade 14 is of relatively thin thickness. Also, it will be noted with reference to FIGS. 1, 2 and 6 that the side portions 34 and 36 are each beveled with the side portion 34 having a beveled surface which inclines outwardly from the top planar surface 30 to the bottom planar surface 32 and with the beveled surface of the side portion 36 being inclined in the opposite direction to that of the beveled surface of the side portion 34, i.e., the beveled surface of the side portion 36 angles inwardly from the top planar surface 30 to the bottom planar surface 32. Curved portions 38 and 40 are provided between the enlarged portion 28 of the shank 12 and top planar surface 30, and between the enlarged portion 28 and the bottom planar surface 32, respectively. The latter curved portions 38 and 40 are formed in accordance with one embodiment of the invention by means of flattening dies.

Continuing with the description of the nature of the construction of the blade 14, the leading end of the latter is provided with a pair of beveled surfaces 42 and 44, intermediate of which the point 16 is integrally joined to the blade 14. As best understood with reference to FIG. 6 of the drawings, the beveled surface 42 is angled so as to be inclined outwardly from the top planar surface 30 to the bottom planar surface 32 while the other beveled surface, i.e., beveled surface 44 is angled in the opposite direction, i.e., is inclined inwardly from the top planar surface 30 to the bottom planar surface 32. In addition, it will be seen with reference to FIG. 6 of the drawings that each of the beveled surfaces 42 and 44 is inclined outwardly from the inner end thereof to the outer end thereof. The beveled surfaces 42 and 44 in a manner yet to be described function as the cutting surfaces of the blade 14.

Figure 6:
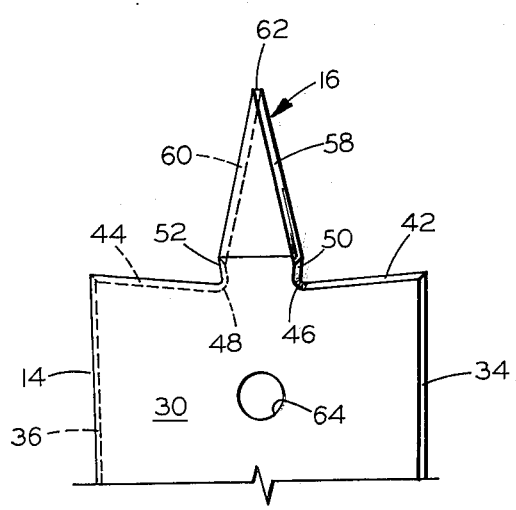
FIG. 6 is a top plan view on an enlarged scale of a portion of the point and blade sections of the spade bit constructed in accordance with the present invention.

As depicted in FIG. 6 of the drawings, curved portions 46 and 48 are provided on either side of the location whereat the point 16 is joined to the blade 14. More specifically, the curved portions 46 and 48 function as corners interconnecting the point 16 with the inner ends of the beveled surfaces 42 and 44, respectively, of the blade 14. The undercut at the junction between the point 16 and the blade 14 blanks out the corners 46 and 48 known to cut inefficiently. Moreover, it will be noted that the side edges of the point 16 which are joined to the curved portions, i.e., corners 46 and 48 angle outwardly a short distance to provide the side edges of the point 16 with the relatively short portions 50 and 52 which are inclined at an angle different from that of the remaining portions of the side edges of the point 16.

Figure 4:
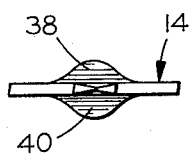
FIG. 4 is a front view of a spade bit constructed in accordance with the present invention.
Figure 5:
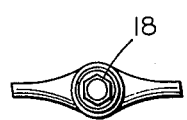
FIG. 5 is a rear view of a spade bit constructed in accordance with the present invention.

Considering now in more detail the construction of the point 16, the latter is provided with an upper substantially flat surface 54 and a lower substantially flat surface 56. The surfaces 54 and 56 are preferably formed by grinding down the upper and lower sides of the point 16 so as to provide the latter with a configuration wherein the rear portion thereof is thicker than the tip 62 thereof. The effect of grinding down the point 16 to provide the aforedescribed surfaces 54 and 56 is to reduce the negative rake and thereby improve the cutting ability thereof. Insofar as concerns the side edges of the point 16, the remaining portions 58 and 60 thereof outwardly of the portions 50 and 52 are inclined inwardly at a relatively sharp angle and terminate in the tip 62. The angle at which the portions 58 and 60 converge define the point angle of the point 16 to which further reference will be had hereinafter. It will merely be noted here that as a result of the fact that the point 16 is provided with a relatively large point angle, the point 16 is caused to perform more of the cutting function as compared to that performed by the cutting surfaces 42 and 44 of the blade 14. As best understood with reference to FIGS. 1, 2 and 6 of the drawings, the side edges of the point 16 are beveled. Thus, it will be seen with reference to the aforereferenced figures of the drawings that the side edge portions 50 and 58 are beveled whereby they incline outwardly from the surface 54 to the surface 56 of the point 16 while the side edge portions 52 and 60 provided on the other side of the point 16 are inclined in the opposite direction, i.e., are beveled whereby to incline inwardly from the surface 54 to the surface 56. Accordingly, as illustrated best in FIG. 4 of the drawings, the aforedescribed construction of the point 16 provides the latter with a generally diamond-shaped configuration.

Completing the description of the structure embodied in the spade bit 10, there is provided in accord with the illustrated embodiment thereof, an opening 64 formed completely through the blade 14 thereof. As depicted, for example, in FIG. 6 of the drawings, the opening 64 is formed in the blade 14 so as to be located substantially equidistant from the side portions 34 and 36 and more nearly adjacent the leading end of the blade 14 than the rear end thereof. One function for which the opening 64 is operable is as a means adapted to receive a support member (not shown) such as a nail, etc. whereby to enable the spade bit 10 to be hung on a supporting surface when not in use.

By way of example, the relative proportions as well as the angular measurements of the various components which comprise the spade bit 10 in accord with one embodiment thereof preferably have the values set forth hereinafter. More specifically, in the case wherein the spade bit 10 takes the form of what is referred to in the art as a one inch spade bit, the overall length thereof, measured from the outer end of the portion 18 of the shank 12 to the tip 62 of the point 16, is approximately 6¼ inches long. The width of the blade 14 is approximately one inch. The value of the latter measurement comprises the characteristic of the spade bit which identifies it as a one inch spade bit. The side portions 34 and 36 of the blade 14 are each provided with a bevel of approximately 2°, and have a slight taper of approximately 1° from the free end of the blade 14 towards the shank 12. Moreover, the cutting surfaces 42 and 44 of the blade 14 are inclined outwardly at an angle of approximately 5½°. In addition, the cutting surfaces 42 and 44 are each beveled at an angle of approximately 10°. The point 16 at the location whereat it is the widest, i.e., at the position where portion 50 joins portion 58 along one side edge thereof and portion 52 joints portion 60 along the other side edge thereof, the point 16 has a width of approximately ¼ inch. The portions 50 and 52 of the side edges of the point 16 are each slightly less than 1/10 of an inch in length and are angled outwardly at an inclination of approximately 10°. Overall, the point 16 has a length of slightly less than 3/5 of an inch measured from the tip 62 thereof to the location whereat the point 16 is joined to the blade 14. The remaining portions of the side edges of the point 16, i.e., the portions 58 and 60 converge in a manner whereby the included angle defined by the planes of the converging portions 58 and 60 is approximately 25½°. The bevel of the portions 58 and 60 of the point 16 has an angular value of approximately 10°. Finally, the planar surfaces 54 and 56 of the point 16 are ground so that the surfaces 54 and 56 converge and meet at the tip 62 whereby the angle of convergence thereof is approximately 8°.

A description will now be set forth of the manner in which the spade bit 10 is intended to be employed. When it is desired to make use of the spade bit 10, the polygonal shaped portion 18 of the shank 12 thereof is inserted into the chuck with which a power tool is commonly provided. The chuck is tightened in conventional fashion causing the jaws thereof to be brought into engagement with and to securely clamp surfaces of the portion 18 thereby tightly mounting the spade bit 10 in the power tool whereby when rotation is imparted to the spade bit 10, the latter will not become disengaged from the power tool. Thereafter, the power tool with the spade bit 10 assembled thereto and the piece of material which it is desired to cut are moved relative to each other until the tip 62 of the point 16 is positioned in juxtaposed relation to the location on the surface of the piece of material whereat it is desired to make the cut. The power tool is then actuated causing the spade bit 10 to rotate. As the spade bit 10 rotates, first the tip 62 of point 16 and then all of the point 16 penetrates the surface of the piece of material. By virtue of the fact that the side edges of the point 16 are beveled so as to be inclined in opposite directions, one of the side edges of the point 16 will comprise the leading surface thereof while the other side edge of the point 16 will comprise the trailing surface thereof. When the point 16 has penetrated a sufficient distance into the surface of the piece of material, the cutting surfaces 42 and 44 of the blade 14 will become operational to perform some of the cutting function. When the cutting operation has been completed, the spade bit 10 is removed from the hole cut in the piece of material. In the event that no further use is to be made immediately of the spade bit 10, the latter may be removed from the power tool by loosening jaws of the chuck thereof. Then through operation of the opening 64 provided in the blade 14, the spade bit 10 may be hung on a suitable supporting surface out of the way, whereat it poses no danger of causing injury to someone accidentally coming into contact therewith.

Although only one embodiment of a spade bit constructed in accordance with the present invention has been shown in the drawings and described hereinabove, it is to be understood that modifications in the construction thereof may be made thereto by those skilled in the art without departing from the essence of the invention. In this connection, some of the modifications which can be made in the spade bit 10 have been alluded to hereinabove while others will become readily apparent to those skilled in the art when exposed to the present description and illustration of the construction of the spade bit 10. For example, it has been set forth previously that the shank 12 of the spade bit 10 other than the portion 18 thereof has a cylindrical configuration. However, it is to be understood that the shank 12 could be provided with a polygonal shaped configuration along its entire length if so desired without departing from the essence of the invention. Moreover, with regard to the angle of inclination of the various beveled surfaces with which the spade bit 10 is provided, in general the value therefor as set forth hereinabove may be decreased by 1° without departing from the preferred embodiment of the invention. Insofar as concerns the various physical dimensions of the spade bit 10, in general although the width of the blade 14 thereof may be varied the overall length of the spade bit 10 will nevertheless remain substantially the same as that given above for the one inch spade bit. However, when the width of the blade 14 is either increased or decreased, a proportional change is preferably also made in the dimensions of the point 16. For example, for a ½ inch spade bit, while the width of the blade 14 is reduced to approximately ½ inch, the point 16 is also reduced in dimensions so that the width thereof is approximately one-fifth of an inch and the length thereof two-fifths of an inch Thus, it can be seen that the present invention provides a novel and improved spade bit of the type particularly adapted to be employed with a hand-type power tool such as an electrical drill or drill press for purposes of cutting through a non-metal material such as wood. Moreover, in accord with the present invention a spade bit is provided consisting of a shank, a blade and a point, and which is formed as an integral member. The spade bit of the present invention has a construction wherein the leading edge of the blade thereof terminates in a pair of beveled surfaces which comprise cutting surfaces with one of the pair of beveled surfaces being inclined in one direction and with the other of the pair of beveled surfaces being inclined in the opposite direction. Furthermore, in accord with the present invention a spade bit is provided wherein the point thereof has a generally diamond-shaped configuration effective as a means of providing a spade bit characterized by its improved efficiency of cutting. Also, a spade bit has been provided in accord with the present invention wherein the point thereof has been ground to reduce the negative rake and thereby improve the cutting ability thereof. Finally, in accordance with the present invention a spade bit has been provided wherein the point thereof is provided with a relatively large point angle to make the point because of its improved cutting efficiency perform more of the cutting function and with less of the cutting function being performed by the cutting surfaces of the blade.

Having thus described the invention, I claim:

1. A spade bit operable for drilling a workpiece comprising:
   a. a shank;
   b. a blade connected at one end to said shank having a pair of substantially flat faces and a pair of side edges extending along the sides of said pair of flat faces axially of said shank; and
   c. a point element on the other end of said blade coaxially with said shank and having side edges diverging towards said side edges of said blade and a pair of faces converging to the tip thereof from the planes of said flat faces of said blade, said pair of side edges of said point element each being angularly disposed with respect to the planes of said pair of faces of said point element and extending parallel to each other so as to provide a generally rhomboidal transverse cross section for said point element, the leading edge portions of said blade extending from either side of said point element to said side edges of said blade being angularly disposed with respect to the planes of said pair of faces of said blade and inclined in the direction of said point element to locate the outer margins thereof on an imaginary line which intersects the point element, and the planes of said leasing edge portions extending at opposite angles to each other and generally in the same angular direction as the adjacent side edges of said point element.

2. The spade bit as set forth in claim 1 wherein said pair of side edges of said point element have portions of reduced width above said imaginary line adjacent the intersection with said blade to provide relief.

3. The spade bit as set forth in claim 1 wherein said point element is integrally formed with said blade intermediate said leading edge portions of said blade and with said shank.

4. The spade bit as set forth in claim 1 wherein the planes of said side edges of said blade are angularly disposed relative to said pair of flat faces of said blade and extend at opposite angles to each other and generally in the direction of angularity of the adjacent leading edge portion of said blade.

5. The spade bit as set forth in claim 1 wherein said pair of side edges of said blade taper inwardly from the adjacent leading edge portion of said blade towards said shank.

6. The spade bit as set forth in claim 1 wherein said blade further includes an indexing hole formed in said pair of flat faces thereof.

7. A spade bit operable for drilling a workpiece comprising:
   a. a shank including a mounting portion adjacent one end for mounting the spade bit in an associated power tool;
   b. a blade connected at one end to the other end of said shank coaxially therewith and having a pair of substantially flat faces and a pair of side edges extending along the sides of said pair of flat faces axially of said shank and blade; and
   c. a point element integral with the other end of said blade coaxially with said shank and having side edges diverging towards said side edges of said blade and a pair of faces converging to the tip thereof from the planes of said flat faces of said blade, said pair of side edges of said point element each being angularly disposed with respect to the planes of said pair of faces of said point element and extending parallel to each other so as to provide a generally rhomboidal transverse cross section for said point element, the leading edge portions of said blade extending from either side of said point element to said side edges of said blade being inclined in planes which extend at opposite angles to each other and generally in the same angular direction as the adjacent side edges of said point element, said point element having a portion of reduced width adjacent the intersection with said blade to provide relief.

8. The spade bit as set forth in claim 7 wherein said leading edge portions of said blade taper inwardly from said side edges of said blade towards said shank to locate the outer margins thereof on an imaginary line which intersects said point element intermediate its length, and the planes of said side edges of said blade are angularly disposed relative to said pair of flat faces of said blade and extend at opposite angles to each other and generally in the direction of angularity of the adjacent leading edge portion of said blade.

9. The spade bit as set forth in claim 7 wherein said point element reduced width portion is defined by generally linear side edge portions converging toward said blade, said point element side edges and blade leading edges blending in curves.

* * * * *